United States Patent
Gustafsson et al.

(10) Patent No.: US 10,205,690 B1
(45) Date of Patent: Feb. 12, 2019

(54) AUTOMATIC REAL-TIME INDICATION OF USER NON-CHAT ACTIVITY DURING A CHAT SESSION

(71) Applicant: Google LLC, Mountain View, CA (US)

(72) Inventors: Per Johan Gustafsson, Stockholm (SE); Emily Soldal, Mountain View, CA (US)

(73) Assignee: Google LLC, Mountain View, CA (US)

( * ) Notice: Subject to any disclaimer, the term of this patent is extended or adjusted under 35 U.S.C. 154(b) by 324 days.

(21) Appl. No.: 14/862,485

(22) Filed: Sep. 23, 2015

Related U.S. Application Data (60) Provisional application No. 62/054,606, filed on Sep. 24, 2014.

(51) Int. Cl.
*H04L 12/58* (2006.01)
*H04L 29/08* (2006.01)

(52) U.S. Cl.
CPC ............ *H04L 51/043* (2013.01); *H04L 51/02* (2013.01); *H04L 51/04* (2013.01); *H04L 67/22* (2013.01)

(58) Field of Classification Search
CPC .............................. H04L 51/04; H04L 67/22
See application file for complete search history.

(56) References Cited

U.S. PATENT DOCUMENTS

| | | | |
|---|---|---|---|
| 7,165,213 B1* | 1/2007 | Busey | H04L 12/1813 709/202 |
| 7,444,379 B2 | 10/2008 | Becker et al. | |
| 7,739,670 B2* | 6/2010 | Gutfleisch | G06F 8/51 717/136 |
| 8,214,749 B2 | 7/2012 | Feinberg et al. | |
| 8,417,784 B2 | 4/2013 | Mandre | |
| 8,688,786 B2 | 4/2014 | Shah | |
| 2005/0086255 A1* | 4/2005 | Schran | G06F 11/34 |
| 2006/0242232 A1* | 10/2006 | Murillo | H04L 12/1813 709/204 |
| 2009/0113315 A1* | 4/2009 | Fisher | G06F 17/30967 715/758 |
| 2010/0127921 A1* | 5/2010 | Chen | G06Q 30/02 705/319 |
| 2014/0282845 A1* | 9/2014 | Dunne | H04L 63/20 726/1 |

* cited by examiner

*Primary Examiner* — Jeong S Park
(74) *Attorney, Agent, or Firm* — IP Spring (57) ABSTRACT

A computer implemented technique can include receiving a level of granularity for displaying non-chat activity indicators and initiating a real-time communication session between first and second computing devices. The technique can also include during the real-time communication session, automatically: (i) detecting non-chat activity by a first user at the first computing device, the non-chat activity being activity by the first user at the first computing device that is outside of a primary function of the real-time communication session, (ii) determining a type of the detected non-chat activity, (iii) determining an indicator of the type of the detected non-chat activity based on a level of granularity, and (iv) outputting the indicator to the second computing device, which is associated with the second user, wherein receipt of the indicator causes the second computing device to display the indicator via the real-time communication session.

20 Claims, 4 Drawing Sheets

AUTOMATIC REAL-TIME INDICATION OF USER NON-CHAT ACTIVITY DURING A CHAT SESSION

CROSS-REFERENCE TO RELATED APPLICATIONS

This application is a non-provisional of and claims the benefit of U.S. Provisional Application No. 62/054,606, filed on Sep. 24, 2014. The entire disclosure of the above application is incorporated herein by reference.

FIELD

The present disclosure relates generally to computer real-time communication sessions and, more particularly, to techniques for automatic real-time indication of user non-chat activity during a chat session.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Real-time communication sessions involve a plurality of users communicating via different computing devices. For example, a text chat session may be initiated between first computing device associated with a first user and a second computing device associated with a second user. The first user can type a text message via the first computing device, which can then be transmitted to the second computing device for display to the second user. In contrast to a video chat session, however, because the second user is only able to see the text message that the first user has sent via the text chat session, the second user is unaware of what the first user is currently doing at the first computing device.

SUMMARY

A computer-implemented technique is presented. The technique can include receiving, at a server having one or more processors, a first level of granularity for displaying non-chat activity indicators associated with the first user during real-time communication sessions with a second user, the first and second users being associated with first and second computing devices, respectively. The technique can include initiating, by the server, a first real-time communication session between the first computing device and the second computing device. The technique can also include during the first real-time communication session, automatically: (i) receiving, at the server, non-chat activity by the first user at the first computing device, the non-chat activity being activity by the first user at the first computing device that is outside of a primary function of the first real-time communication session, (ii) receiving, at the server, a type of the detected non-chat activity, (iii) determining, at the server, a first indicator of the type of the detected non-chat activity based on the first level of granularity, and (iv) outputting, from the server, the first indicator to the second computing device, wherein receipt of the first indicator causes the second computing device to display the first indicator via the first real-time communication session.

In some embodiments, the technique can further include: outputting, from the server to the first computing device, an authorization request for the first user to authorize the display of non-chat activity indicators during real-time communication sessions with the second user, and in response to receipt of the authorization request, receiving, at the server, the first level of granularity, wherein receipt of the first level of granularity causes the server to authorize the display of non-chat activity indicators for the first user during real-time communication sessions with the second user.

In other embodiments, the technique can further include determining, at the server, a sub-type of the type of the detected non-chat activity.

In some embodiments, the indicator is indicative of the sub-type of the detected non-chat activity.

In other embodiments, the indicator is determined to be indicative of (i) the type or (ii) the sub-type of the detected non-chat activity based on the first level of granularity.

In some embodiments, the indicator includes at least one of (i) text description of the type of detected non-chat activity and (ii) iconography representative of the type of detected non-chat activity.

In other embodiments, the first real-time communication session is within web browser software executing on the first computing device, and wherein the detected non-chat activity is activity within the web browser software but outside of the primary function of the first real-time communication session.

In some embodiments, the detected non-chat activity is within (i) a different application of the web browser software than the first real-time communication session, (ii) a different window of the web browser software than the first real-time communication session, or (iii) a different tab of the web browser software than the first real-time communication session.

In other embodiments, the technique can further include: receiving, at the server, a second level of granularity for displaying non-chat activity indicators associated with the first user during real-time communication sessions with a third user associated with a third computing device, the second level of granularity being different than the first level of granularity, initiating, by the server, a second real-time communication session between the first computing device and the third computing device, automatically determining, by the server, a second indicator of the type of the detected non-chat activity based on the second level of granularity, the second indicator being different than the first indicator, and automatically outputting, from the server, the second indicator to the third computing device, wherein receipt of the second indicator causes the third computing device to display the second indicator via the second real-time communication session.

In some embodiments: the second indicator is more descriptive than the first indicator when the second level of granularity is greater than the first level of granularity, and the first indicator is more descriptive than the second indicator when the first level of granularity is greater than the second level of granularity.

A server having one or more processors configured to perform operations is also presented. The operations can include receiving a first level of granularity for displaying non-chat activity indicators associated with the first user during real-time communication sessions with a second user, the first and second users being associated with first and second computing devices, respectively. The operations can include initiating a first real-time communication session between the first computing device and the second computing device. The operations can also include during the first real-time communication session, automatically: (i) receiving non-chat activity by the first user at the first computing device, the non-chat activity being activity by the first user at the first computing device that is outside of a primary function of the first real-time communication session, (ii) receiving a type of the detected non-chat activity, (iii) determining a first indicator of the type of the detected non-chat activity based on the first level of granularity, and (iv) outputting the first indicator to the second computing device, wherein receipt of the first indicator causes the second computing device to display the first indicator via the first real-time communication session.

In some embodiments, the operations further include: outputting, to the first computing device, an authorization request for the first user to authorize the display of non-chat activity indicators during real-time communication sessions with the second user, and in response to receipt of the authorization request, receiving the first level of granularity, wherein receipt of the first level of granularity causes the server to authorize the display of non-chat activity indicators for the first user during real-time communication sessions with the second user.

In other embodiments, the operations further include determining a sub-type of the type of the detected non-chat activity.

In some embodiments, the indicator is determined to be indicative of (i) the type or (ii) the sub-type of the detected non-chat activity based on the first level of granularity.

In other embodiments, the indicator includes at least one of (i) text description of the type of detected non-chat activity and (ii) iconography representative of the type of detected non-chat activity.

In some embodiments, the first real-time communication session is within web browser software executing on the first computing device, and wherein the detected non-chat activity is activity within the web browser software but outside of the primary function of the first real-time communication session.

In other embodiments, the detected non-chat activity is within (i) a different application of the web browser software than the first real-time communication session, (ii) a different window of the web browser software than the first real-time communication session, or (iii) a different tab of the web browser software than the first real-time communication session.

In some embodiments, the operations further include: receiving a second level of granularity for displaying non-chat activity indicators associated with the first user during real-time communication sessions with a third user associated with a third computing device, the second level of granularity being different than the first level of granularity, initiating a second real-time communication session between the first computing device and the third computing device, automatically determining a second indicator of the type of the detected non-chat activity based on the second level of granularity, the second indicator being different than the first indicator, and automatically outputting the second indicator to the third computing device, wherein receipt of the second indicator causes the third computing device to display the second indicator via the second real-time communication session.

In other embodiments: the second indicator is more descriptive than the first indicator when the second level of granularity is greater than the first level of granularity, and the first indicator is more descriptive than the second indicator when the first level of granularity is greater than the second level of granularity.

Another computer-implemented technique is also presented. The technique can include establishing, by a first computing device via server, a real-time communication session with a second computing device associated with a second user, wherein establishing the real-time communication session causes the server to obtain a level of granularity for displaying non-chat activity indicators associated with the first user during the real-time communication session. During the real-time communication session, the technique can include: (i) receiving, by the first computing device, non-chat activity by the first user, the non-activity being activity by the first user at the first computing device that is outside of a primary function of the real-time communication session, and (ii) communicating, by the first computing device with the server, such that the server obtains a type of the detected non-chat activity. Obtaining the type of the detected non-chat activity can cause the server to (a) determine a first indicator of the type of the detected non-chat activity based on the first level of granularity and (b) output the first indicator to the second computing device. Receipt of the first indicator can cause the second computing device to display the first indicator via the real-time communication session.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As discussed above, a real-time communication session can be initiated between a first computing device associated with a first user and a second computing device associated with a second user. During the real-time communication session or in a menu associated with real-time communication sessions (e.g., a list of users associated with the second user), the second user may be unaware of what the first user is currently doing at the first computing device. For example, the first user may be in the middle of document editing or software coding, which, if known by the second user, may cause the second user to leave the first user alone or prompt the user to ask about the first user's activity. Conventional activity indicators for real-time communication sessions may include a status of the first user (active, busy, away, sleeping, etc.) and/or in-session activity of the first user (e.g., "The first user is currently typing . . . "). These activity indicators, however, fail to inform the second user as to what the first user is actually doing. Moreover, many of these indicators require manual activation by the second user (e.g., selecting a status of "busy").

Accordingly, techniques are presented for automatic real-time indication of user non-chat activity during a real-time communication session. During a real-time communication session, a server can detect non-chat activity by the first user. For purposes of simplicity, the real-time communication sessions are hereinafter referred to as text chat sessions. It will be appreciated, however, that these techniques can extend to other real-time communication session (e.g., video chat sessions) and the non-chat activity may differ for different sessions (e.g., camera activity being specific to video chat sessions). Provided the first user has authorized this service, the detection, classification, and indication of the first user's non-chat activity to the second user can be performed automatically and in real-time. The non-chat activity represents activity by the first user at the first computing device that is outside of a primary function of the real-time communication session. For example, the primary function of a text chat session may be typing characters and the primary function of a video chat session may be interacting with a microphone/camera to provide audio/video. The server can then determine a type of the non-chat activity. Examples of the type of non-chat activity include document editing, email activity, software coding, and web browsing, such as reading news. Types of non-chat activity can also be divided into sub-types of non-chat activity. For example, email activity may be further divided into sub-types of email creation/editing and email reading. After determining the type of non-chat activity, the server can then output an indicator to the second computing device. Additionally or alternatively, the server may output the indicator to another computing device that is associated with a real-time communication session menu that is associated with the first user (e.g., a list of users that are associated with a user of the other computing device and that includes the first user).

Depending on preference settings, this indicator may reflect the type of non-chat activity or a more specific sub-type of non-chat activity. Receiving the indicator causes the second computing device to display the indicator via the chat session. In one specific implementation, iconography can be used to indicate the various indicators. In one specific implementation, the text chat session is web-based and the non-chat activity can be web-based activity, which can be further based on web browser tabs and/or web browser applications. To protect user privacy, embodiments require a user's explicit authorization before the user's non-chat activity is recorded, transmitted, or stored. Different levels of sharing may also be implemented, such as via user preferences and/or an access control list (ACL) so that the first user can specify certain other users who can view her/his non-chat activity information, the first user can specify certain non-chat activities for which information can be shared with others, and combinations thereof. These user sharing preferences can also be referred to as a "level of granularity" indicative of a degree of information that the first user wishes others to be able to see. Thus, the techniques are capable of sharing a "super rich presence" of the first user with the second user.

In situations in which the systems discussed here collect personal information about users, or may make use of personal information, the users are provided with opportunities to control whether programs or features collect user information (e.g., information about a user's social network, social actions or activities, profession, a user's preferences, or a user's current location), and/or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how and whether information is collected about the user and used by a content server.

Figure 1:
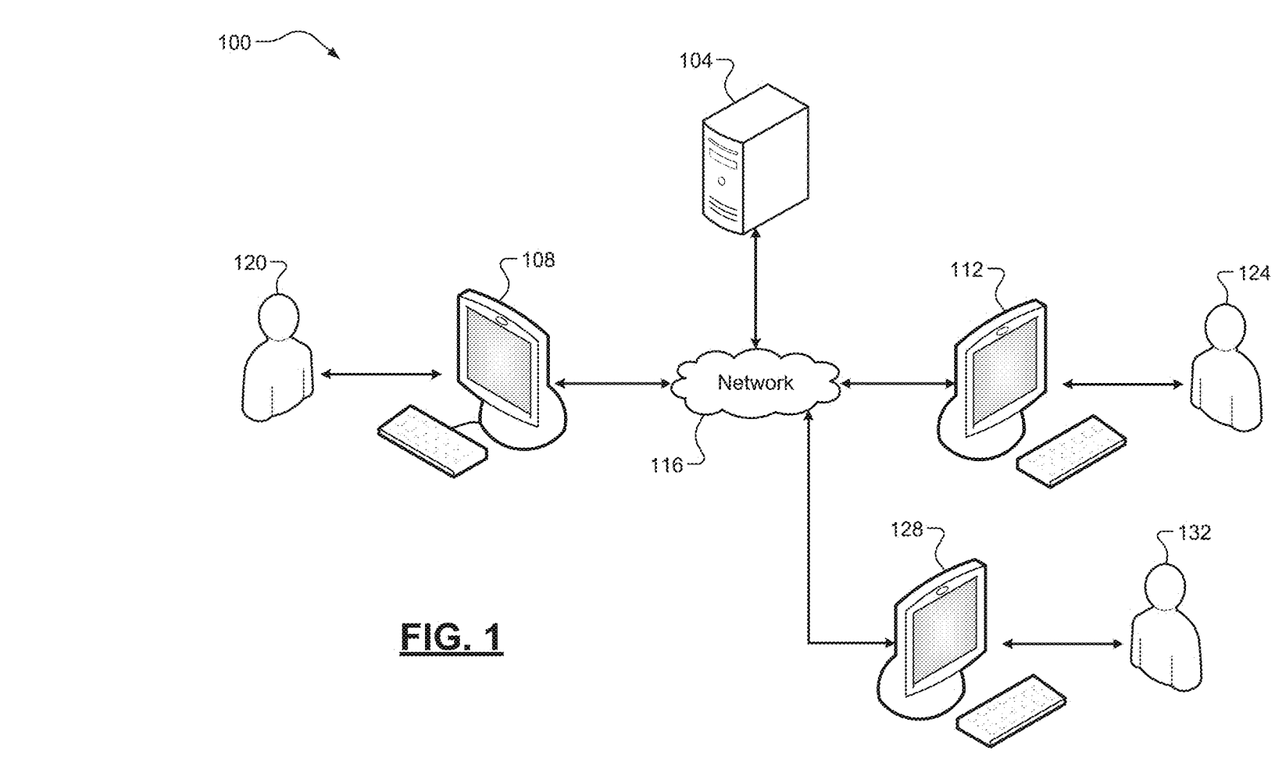
FIG. 1 is a diagram of a computing network including an example server according to some implementations of the present disclosure.

Referring now to FIG. 1, a diagram of a computing network 100 is illustrated. The computing network 100 can include an example server 104 according to some implementations of the present disclosure. The term "server" as used herein can refer to any suitable hardware computing device having one or more processors, as well as both a single server and a plurality of servers operating in a parallel or distributed architecture. The server 104 can communicate with a first computing device 108 and a second computing device 112 via a network 116. The server 104 can also communicate with other components via the network 116, such as other servers (e.g., a web server). The network 116 can include a local area network (LAN), a wide area network (WAN), e.g., the Internet, or a combination thereof.

The first computing device 108 can be associated with a first user 120, and the second computing device 112 can be associated with a second user 124. Examples of the first and second computing devices 108, 112 include desktop computers, laptop computers, tablet computers, mobile phones, and wearable technology, such as eyewear or a smartwatch that incorporates a computing device. A text chat session can be initiated between the first and second computing devices 108, 112 to enable the first and second users 120, 124 to communicate via text messaging. This text chat session can be initiated and controlled by the server 104. For example, the text chat session may be initiated in response to a chat request from one or both of the first and second computing devices 108, 112.

In some implementations, the computing network 100 can also include a third computing device 128 associated with a third user 132. The third computing device 128 can be a same or similar device as the first and/or second computing devices 108, 112. The server 104 can initiate a text chat session between the first and third computing devices 108, 128. This text chat session can be referred to as a "second text chat session," whereas the other text chat session between the first and second computing devices 108, 112 can be referred to as a "first text chat session." These text chat sessions can be initiated and executed simultaneously, although one of the text chat sessions may be actually initiated before the other. It should be appreciated that the first and second text chat sessions could also be a single text chat session, such as a three-way text chat session. Depending on the levels of granularity associated with the second and third users 124, 132, these users may view different indicators at their respective computing devices 112, 128, which is discussed in greater detail below.

Figure 2:
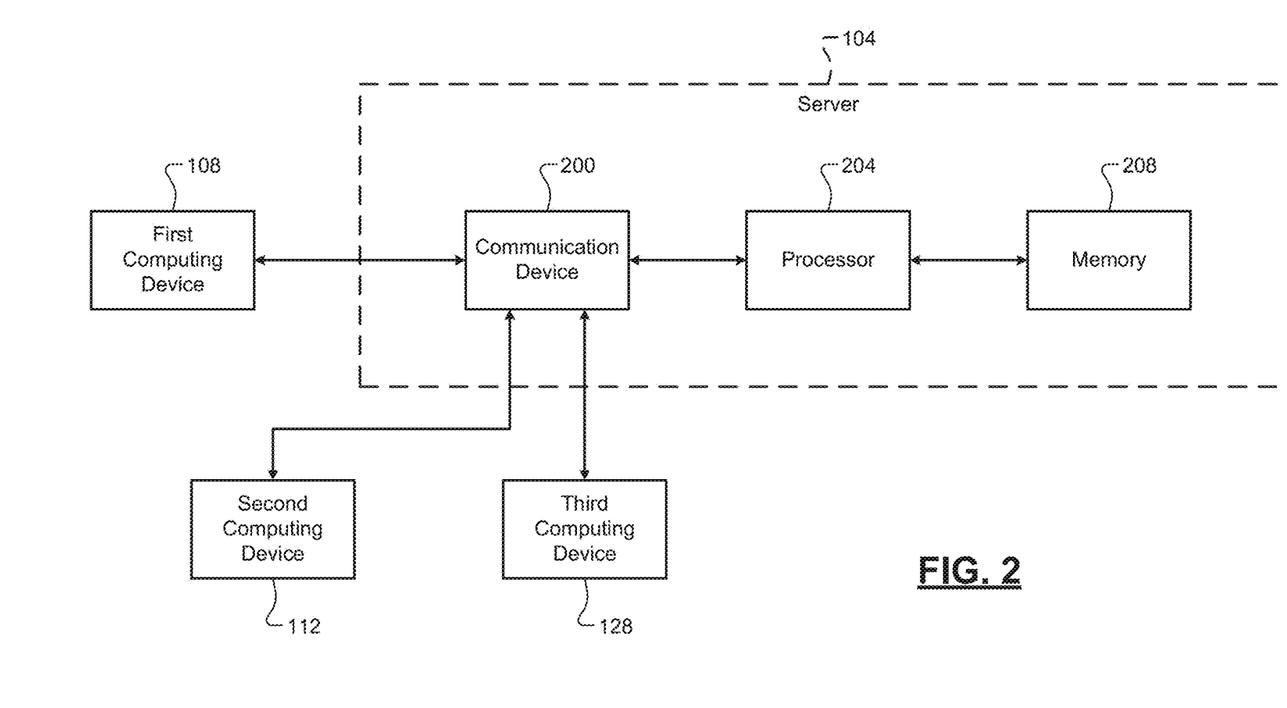
FIG. 2 is a functional block diagram of the example server of FIG. 1.

Referring now to FIG. 2, a functional block diagram of the example server 104 is illustrated. The server 104 can include a communication device 200, a processor 204, and a memory 208. The communication device 200 can include any suitable components (e.g., a transceiver) configured for communication via the network 116. The processor 204 can control operation of the server 104, such as performing functions including, but not limited to, loading/executing an operating system of the server 104, controlling communication via the communication device 200, and controlling read/write operations at the memory 208. The term "processor" as used herein can refer to both a single processor and a plurality of processors operating in a parallel or distributed architecture. The memory 208 can be any suitable storage medium (flash, hard disk, etc.) configured to store information at the server 104. The processor 204 can also be configured to implement at least a portion of the techniques of the present disclosure, which are described in greater detail below.

The server 104 can determine whether the first user 120 has authorized the display of non-chat activity indicators at other computing devices (e.g., the second computing device 112). While the non-chat activity is described with respect to the first user 120 and the first computing device 108 and the indicator is described with respect to the second user 124 and the second computing device 112, the techniques of the present disclosure can be applied to any suitable set of two or more users and two or more computing devices. The server 104 can initiate a text chat session between the first and second computing devices 108, 112. In one implementation, the text chat session is at least partially a web-based text chat session that is initiated via web browser software executing on one or both of the first and second computing devices 108, 112. For example, the text chat session may be initiated in response to a chat request from one or both of the first and second computing devices 108, 112. The determination of whether the first user 120 has authorized the display of non-chat activity indicators can be made before, during, or after initiation of the text chat session.

The server 104 can also receive level of granularity for the display of non-chat activity indicators associated with the first user 120. The level of granularity represents a desired level of display of non-chat activity indicators for the first user 120 to other users, such as the second user 124. The level of granularity may be received from the first computing device 108 or may have been previously provided to and stored at the memory 208 of the server 104. For example, the level of granularity may be stored in a user profile associated with the first user 108. In some implementations, the first user 120 may have different levels of granularity for different users, such as the second user 124. In one implementation, ACLs can be utilized to specify the level of granularity for sharing with other users. These different levels of granularity may be used by the server 104 to display different levels of detail for the non-chat activity indicators, which are described in greater detail below.

Once the text chat session is initiated and the first user 120 has authorized the display of non-chat activity indicators, the following operations can be performed automatically during the text chat session. The server 104 can detect non-chat activity by the first user 120 at the first computing device 108. Alternatively, the first computing device 108 may itself detect the non-chat activity by the first user 120 and provide such information to the server 104. The term "non-chat activity" as used herein can refer to interaction by the first user 120 with other software applications at the first computing device 108 that are outside of (e.g., different than) the text chat session. In one implementation, the non-chat activity is physical interaction (e.g., via a mouse, a keyboard, and/or a touchpad or touch display) and thus does not include other interaction, such as sound capturing (e.g., a microphone, a telephone, etc.). When the text chat session is a web-based text chat session, the non-chat activity may be the first user 120 utilizing other applications within the web browser software, or utilizing other tabs/windows of the web browser software.

When non-chat activity is detected, the server 104 can determine a type of the non-chat activity. Alternatively, the first computing device 108 may itself determine the type (and, in some cases, a sub-type) of the non-chat activity and provide such information to the server 104. The type of the non-chat activity may indicate a general type of the non-chat activity. Examples of the type of non-chat activity include web browsing, document editing, and email. As mentioned above, in some implementations the server 104 may determine a sub-type of the type of non-chat activity. The sub-type of the non-chat activity may be a specific type of the non-chat activity and/or metadata involved with the non-chat activity, such as how long the non-chat activity has been occurring, when the non-chat activity started, and/or who else is involved in the non-chat activity (user(s), location(s), etc.). Examples of the sub-type of non-chat activity include reading a news webpage, reading a received email, and creating/composing a new email. Such information could be obtained via the software (web browser, email client, etc.), the operating system (e.g., to determine the currently active/utilized software), or some combination thereof. Such information could also be obtained or predicted based on a user calendar or activity history. It should be appreciated that more than two levels of detail can be utilized for defining types and sub-types of non-chat activity. Depending on the level of granularity for the first user 120, or a specific level of granularity for the first user 120 with respect to the second user 124, the type or the sub-type of the non-chat activity can be displayed to the second user 124.

Specifically, the server 104 can determine an indicator of the type or sub-type of non-chat activity. In one implementation, the indicator can be a text description of the type or sub-type of non-chat activity (e.g., "The user is writing code."). In another implementation, the indicator can be iconography that is indicative of the type or sub-type of non-chat activity (e.g., an email icon representing email activity). Combinations of text and iconography may also be used. After the indicator is determined, the server 104 can output the indicator to the second computing device 112. Receipt of the indicator can cause the second computing device 112 to display the indicator as part of the text chat session. For example, the indicator may be displayed next to a name of the first user 120 in the text chat session or at a bottom of the text chat session. The indicator can be viewed by the second user 124, thereby informing him/her in real-time as to the type or sub-type of non-chat activity that the first user 120 is currently performing.

In one implementation, the server 104 can determine and output different indicators for the same detected non-chat activity of the first user 120. More specifically, the server 104 can determine and output different indicators to different computing devices when users associated with the different computing devices are associated with different levels of granularity for the first user 120. For example, the detected non-chat activity of the first user 120 may be the first user 120 is reading a news webpage. One user may be associated with a low level of granularity for the first user 120, and thus the indicator provided to their computing device may be vague or non-descriptive, such as "Busy" or "Away," or merely less specific or detailed than the actual detected non-chat activity, such as "Web browsing." Another user, however, may be associated with a high level of granularity for the first user 120, and thus the indicator provided to their computing device may be more detailed or descriptive, such as "Reading news" or "Reading news on . . . " followed by a specific webpage or a hyperlink.

Figure 3:
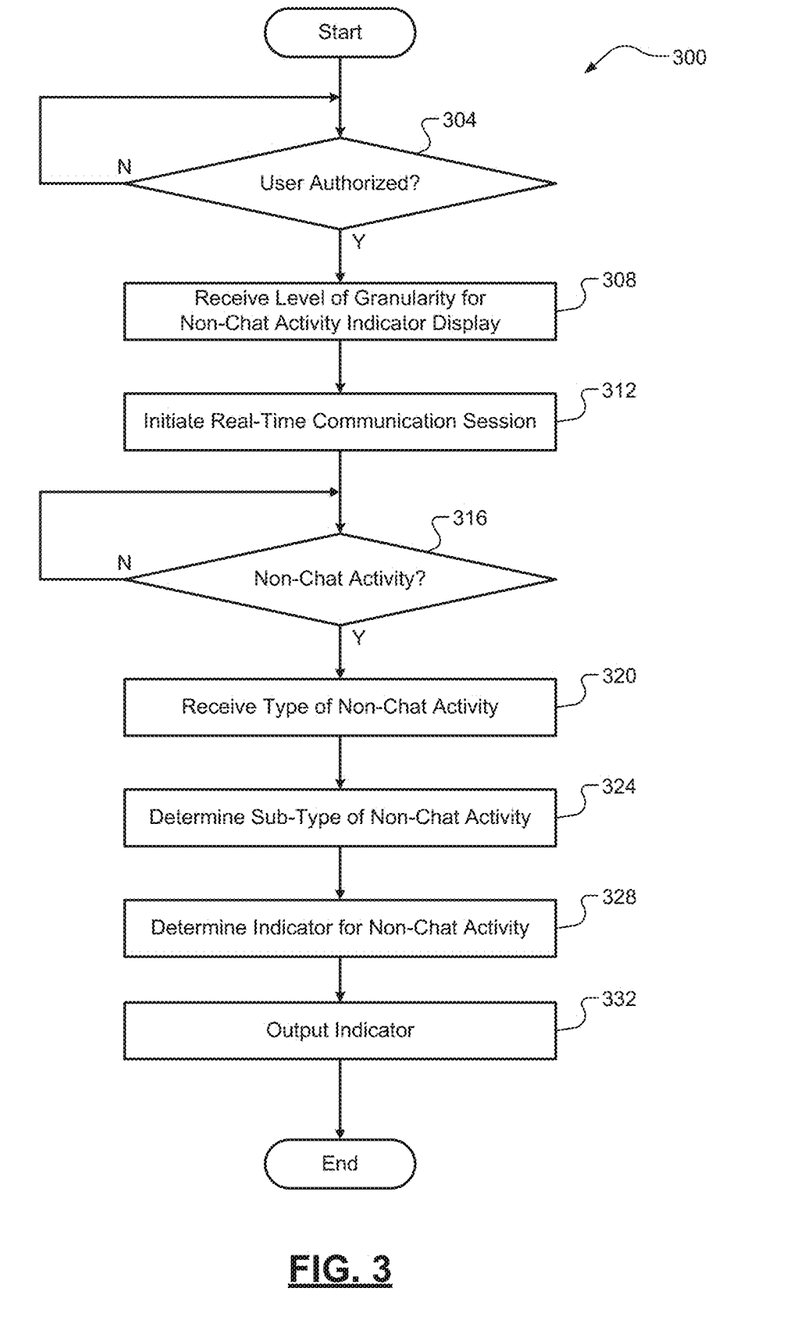
FIG. 3 is a flow diagram of an example technique for automatic real-time indication of user non-chat activity during a real-time communication session according to some implementations of the present disclosure.

Referring now to FIG. 3, a flow diagram of an example technique 300 for automatic real-time indication of user non-chat activity during a text chat session is illustrated. At 304, the server 104 can determine whether the first user 120 has authorized displaying non-chat activity indicators during text chat sessions. If the first user 120 has authorized the display of non-chat activity indicators, the technique 300 can proceed to 304. If the first user 120 has not authorized the display of non-chat activity indicators, the technique 300 can end or return to 304. At 308, the server 104 can receive, from the first computing device 108, a level of granularity for display of non-chat activity indicators associated with the first user 120 during text chat sessions. At 312, the server 104 can initiate a text chat session between the first computing device 108 and the second computing device 112 associated with the second user 124. For example, the text chat session may be initiated in response to a chat request from one or both of the first user 120 and the second user 124. Upon initiating the text chat session, at least some of the following operations (e.g., 316 to 332) can be performed automatically during the text chat session.

At 316, the server 104 can detect non-chat activity by the first user 120 at the first computing device 108, the non-chat activity being activity by the first user 120 at the first computing device 108 that is outside of the text chat session. When non-chat activity is detected, the technique 300 can proceed to 320. If no non-chat activity is detected, the technique 300 can end or return to 316. At 320, the server 104 can determine a type of the detected non-chat activity. At 324, the server 104 can determine a sub-type of the type of detected non-chat activity. At 328, the server 104 can determine an indicator of the type or the sub-type of the detected non-chat activity based on the level of granularity. For example, the indicator may include at least one of (a) a text description of the type or the sub-type of the detected non-chat activity and (b) iconography representative of the type or the sub-type of the detected non-chat activity. At 332, the server 104 can output the indicator to the second computing device 112, wherein receipt of the indicator causes the second computing device 112 to display the indicator via the text chat session. For example, the second computing device 112 may display the indicator as part of the example user interfaces (UI) of FIG. 4A-4B, which is described in greater detail below. The technique 300 can then end or return to 304.

Figure 4A:
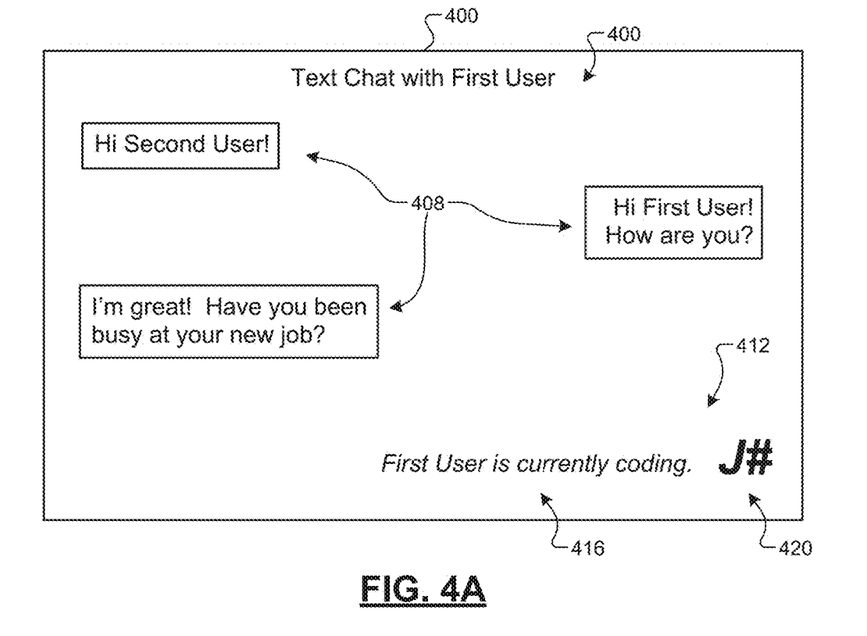
FIGS. 4A-4B are example user interfaces (UI) for the automatic real-time indication of user non-chat activity during a real-time communication session according to some implementations of the present disclosure.
Figure 4B:
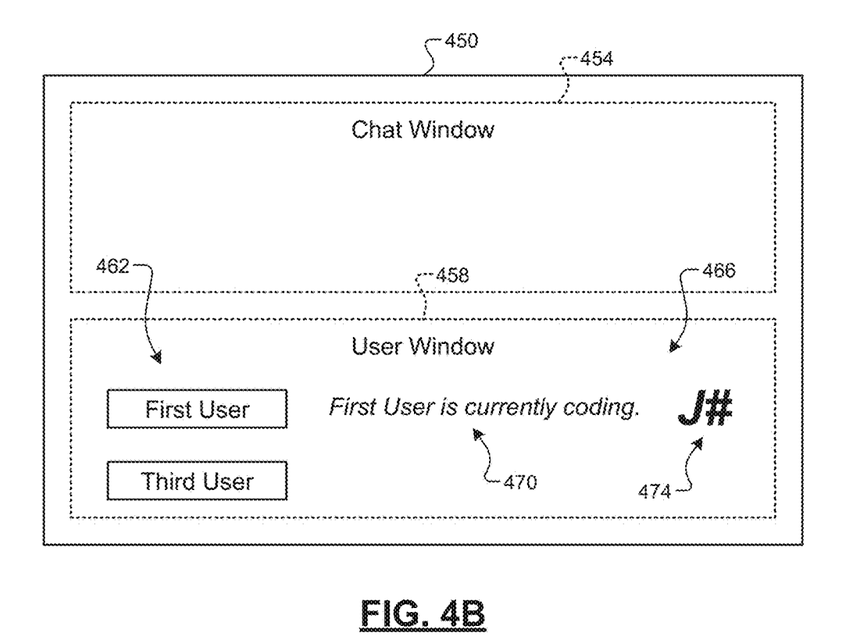

Referring now to FIGS. 4A-4B, example UIs 400, 450 are illustrated. As mentioned above, the UIs 400, 450 can be displayed by the second computing device 112 or another computing device associated with the first user 120. For example, UI 400 may be part of a virtual communication session involving the first user 120, whereas UI 450 may be part of a list of associated users (e.g., a friends list) that includes the first user 120.

In FIG. 4A, the UI 400 includes a chat window 404 for the real-time communication session. The chat window 404 can display messages 408 between the first user 120 and the second user 124. An indicator 412 can be displayed as part of the chat window 404. As shown, the indicator 412 includes both descriptive text 416 for the non-chat activity ("First User is currently coding") as well as an icon 420 representative of the non-chat activity ("J#", which can be representative of Java coding or coding in general). While both the descriptive text 416 and the icon 420 are shown, it should be appreciated that only one of these could be displayed at a given time.

In FIG. 4B, the UI 450 includes a chat window 454 and a user window 458 that includes a plurality of users 462 associated with the second user 124. The plurality of users 462 can include the first user 120 and, in some implementations, each of the plurality of users 462 may be a potential participant in a real-time communication session with the second user 124. The user window 458 can include an indicator 466 of the type/sub-type of the detected non-chat activity of the first user 120. The indicator 466, as shown, includes the same descriptive text 470 and representative icon 474 as the indicator 412 of FIG. 4A. It should be appreciated, however, that other descriptive text and/or icons could be utilized. Further, descriptive text and/or icons indicative of detected non-chat activity could be displayed for some or all of a remainder of the plurality of users 462.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer implemented method, comprising:
   receiving, at a server having one or more processors, a first level of granularity for displaying non-chat activity indicators associated with a first user during a first communication session with a second user, the first and second users being associated with first and second computing devices, respectively, wherein the first user instructed the second user to be associated with the first level of granularity;
   initiating, by the server, the first communication session between the first computing device and the second computing device; and
   during the first communication session, automatically:
   (i) detecting, at the server, non-chat activity by the first user at the first computing device, the detected non-chat activity being interaction by the first user with the first computing device that is outside of a primary function of the first communication session;
   (ii) determining, at the server, a type of the detected non-chat activity;
   (iii) determining, at the server, a first indicator of the type of the detected non-chat activity based on the first level of granularity, wherein the first level of granularity affects an amount of detail of the type of the detected non-chat activity that is conveyed by the first indicator; and
   (iv) outputting, from the server, the first indicator to the second computing device, wherein receipt of the first indicator causes the second computing device to display the first indicator via the first communication session.

2. The computer-implemented method of claim 1, further comprising:
outputting, from the server to the first computing device, an authorization request for the first user to authorize the display of non-chat activity indicators during the first communication session with the second user; and
in response to receipt of the authorization request, receiving, at the server, the first level of granularity, wherein receipt of the first level of granularity causes the server to authorize the display of non-chat activity indicators for the first user during the first communication session with the second user.

3. The computer-implemented method of claim 1, further comprising determining, at the server, a sub-type of the type of the detected non-chat activity, wherein the first indicator is indicative of the type of the detected non-chat activity and a second indicator is indicative of the sub-type of the detected non-chat activity.

4. The computer-implemented method of claim 3, wherein the level of granularity for the second user is included in an access control list.

5. The computer-implemented method of claim 1, wherein responsive to the type of the detected non-chat activity being reading, the first indicator includes a webpage or a hyperlink associated with the non-chat activity of reading.

6. The computer-implemented method of claim 1, wherein the first indicator includes at least one of (i) text description of the type of the detected non-chat activity and (ii) iconography representative of the type of the detected non-chat activity.

7. The computer-implemented method of claim 1, wherein the first communication session is within web browser software executing on the first computing device, and wherein the detected non-chat activity is activity within the web browser software but outside of a primary function of the first communication session.

8. The computer-implemented method of claim 7, wherein the detected non-chat activity is within (i) a different application of the web browser software than the first communication session, (ii) a different window of the web browser software than the first communication session, or (iii) a different tab of the web browser software than the first communication session.

9. The computer-implemented method of claim 1, further comprising:
receiving, at the server, a second level of granularity for displaying non-chat activity indicators associated with the first user during a second communication session with a third user associated with a third computing device, the second level of granularity being different than the first level of granularity;
initiating, by the server, the second communication session between the first computing device and the third computing device;
automatically determining, by the server, a second indicator of the type of the detected non-chat activity based on the second level of granularity, the second indicator being different than the first indicator; and
automatically outputting, from the server, the second indicator to the third computing device, wherein receipt of the second indicator causes the third computing device to display the second indicator via the second communication session.

10. The computer-implemented method of claim 9, wherein:
the second indicator is more descriptive than the first indicator when the second level of granularity is greater than the first level of granularity; and
the first indicator is more descriptive than the second indicator when the first level of granularity is greater than the second level of granularity.

11. A server having one or more processors configured to perform operations comprising:
receiving a first level of granularity for displaying non-chat activity indicators associated with a first user during a first communication session with a second user, the first and second users being associated with first and second computing devices, respectively, wherein the first user instructed the second user to be associated with the first level of granularity;
initiating the first communication session between the first computing device and the second computing device; and
during the first communication session, automatically:
(i) detecting non-chat activity by the first user at the first computing device, the detected non-chat activity being interaction by the first user with the first computing device that is outside of a primary function of the first communication session;
(ii) determining a type of the detected non-chat activity;
(iii) determining a first indicator of the type of the detected non-chat activity based on the first level of granularity, wherein the first level of granularity affects an amount of detail of the type of the detected non-chat activity that is conveyed by the first indicator; and
(iv) outputting the first indicator to the second computing device, wherein receipt of the first indicator causes the second computing device to display the first indicator via the first communication session.

12. The server of claim 11, wherein the operations further comprise:
outputting, to the first computing device, an authorization request for the first user to authorize the display of non-chat activity indicators during the first communication session with the second user; and
in response to receipt of the authorization request, receiving the first level of granularity, wherein receipt of the first level of granularity causes the server to authorize the display of non-chat activity indicators for the first user during the first communication session with the second user.

13. The server of claim 11, wherein the operations further comprise determining a sub-type of the type of the detected non-chat activity.

14. The server of claim 13, wherein the indicator is determined to be indicative of (i) the type or (ii) the sub-type of the detected non-chat activity based on the first level of granularity.

15. The server of claim 11, wherein the first indicator includes at least one of (i) text description of the type of the detected non-chat activity and (ii) iconography representative of the type of the detected non-chat activity.

16. The server of claim 11, wherein the first communication session is within web browser software executing on the first computing device, and wherein the detected non-chat activity is activity within the web browser software but outside of a primary function of the first communication session.

17. The server of claim 16, wherein the detected non-chat activity is within (i) a different application of the web browser software than the first communication session, (ii) a different window of the web browser software than the first communication session, or (iii) a different tab of the web browser software than the first communication session.

18. The server of claim 11, wherein the operations further comprise:
- receiving a second level of granularity for displaying non-chat activity indicators associated with the first user during a first communication session with a third user associated with a third computing device, the second level of granularity being different than the first level of granularity;
- initiating a second communication session between the first computing device and the third computing device;
- automatically determining a second indicator of the type of the detected non-chat activity based on the second level of granularity, the second indicator being different than the first indicator; and
- automatically outputting the second indicator to the third computing device, wherein receipt of the second indicator causes the third computing device to display the second indicator via the second communication session.

19. The server of claim 18, wherein:
- the second indicator is more descriptive than the first indicator when the second level of granularity is greater than the first level of granularity; and
- the first indicator is more descriptive than the second indicator when the first level of granularity is greater than the second level of granularity.

20. A computer-implemented method, comprising:
establishing, by a first computing device via server, a first communication session with a second computing device associated with a second user, wherein establishing the communication session causes the server to obtain a level of granularity for displaying non-chat activity indicators associated with a first user during the communication session, the first user being associated with the first computing device, wherein the first user instructed the second user to be associated with the first level of granularity; and
during the communication session:
- (i) detecting, by the first computing device, non-chat activity by the first user, the detected non-chat activity being interaction by the first user with the first computing device that is outside of a primary function of the communication session; and
- (ii) communicating, by the first computing device with the server, such that the server determines a type of the detected non-chat activity,
wherein obtaining the type of the detected non-chat activity causes the server to (a) determine a first indicator of the type of the detected non-chat activity based on the first level of granularity, wherein the first level of granularity affects an amount of detail of the type of the detected non-chat activity that is conveyed by the first indicator, and (b) output the first indicator to the second computing device, and
wherein receipt of the first indicator causes the second computing device to display the first indicator via the communication session.

* * * * *